United States Patent
Schulz et al.

(10) Patent No.: US 11,332,129 B2
(45) Date of Patent: May 17, 2022

(54) METHOD AND CONTROL UNIT FOR ACTIVATING AN EMERGENCY BRAKING FUNCTION OF A VEHICLE

(71) Applicant: Robert Bosch GmbH, Stuttgart (DE)

(72) Inventors: Andreas Schulz, Loewenstein-Hoesslinsuelz (DE); Armin Koehler, Sachsenheim (DE); Gian Antonio D'Addetta, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 138 days.

(21) Appl. No.: 16/623,505

(22) PCT Filed: Apr. 11, 2018

(86) PCT No.: PCT/EP2018/059270
§ 371 (c)(1),
(2) Date: Dec. 17, 2019

(87) PCT Pub. No.: WO2018/233893
PCT Pub. Date: Dec. 27, 2018

(65) Prior Publication Data
US 2021/0146918 A1 May 20, 2021

(30) Foreign Application Priority Data

Jun. 20, 2017 (DE) .......................... 102017210301.9

(51) Int. Cl.
| | |
|---|---|
| *B60W 30/09* | (2012.01) |
| *B60W 10/30* | (2006.01) |
| *B60W 10/184* | (2012.01) |
| *B60R 21/0134* | (2006.01) |
| *B60T 7/22* | (2006.01) |
| *B60T 8/17* | (2006.01) |

(Continued)

(52) U.S. Cl.
CPC ........... *B60W 30/09* (2013.01); *B60N 2/4279* (2013.01); *B60R 21/0134* (2013.01); *B60T 7/22* (2013.01);
(Continued)

(58) Field of Classification Search
CPC .... B60W 10/30; B60W 10/184; B60W 30/09; B60W 2710/18; B60W 2710/30;
(Continued)

(56) References Cited

U.S. PATENT DOCUMENTS

| | | | |
|---|---|---|---|
| 7,654,573 B2 | 2/2010 | Kudo et al. | |
| 9,067,555 B1 * | 6/2015 | Deng | .................... B60R 21/013 |

(Continued)

FOREIGN PATENT DOCUMENTS

| | | |
|---|---|---|
| DE | 102004057603 A1 | 4/2006 |
| DE | 102014205257 A1 | 9/2015 |

(Continued)

OTHER PUBLICATIONS

International Search Report for PCT/EP2018/059270, dated Jun. 29, 2018.

*Primary Examiner* — Peter D Nolan
*Assistant Examiner* — Demetra R Smith-Stewart
(74) *Attorney, Agent, or Firm* — Norton Rose Fulbright US LLP; Gerard Messina

(57) ABSTRACT

A method for activating an emergency braking function of a vehicle. At least one restraint unit is activated in the process for restraining at least one occupant of the vehicle in response to an identification of an imminent triggering of the emergency braking function, using at least one sensor signal of at least one sensor of the vehicle. The triggering of the emergency braking function takes place when the restraint unit is activated.

10 Claims, 3 Drawing Sheets

(51) Int. Cl.
*B60N 2/427* (2006.01)
*G01S 13/931* (2020.01)
*B60R 21/01* (2006.01)

(52) U.S. Cl.
CPC ............ *B60T 8/17* (2013.01); *B60W 10/184* (2013.01); *B60W 10/30* (2013.01); *G01S 13/931* (2013.01); *B60R 2021/01259* (2013.01); *B60T 2201/024* (2013.01); *B60W 2710/18* (2013.01); *B60W 2710/30* (2013.01); *G01S 2013/93185* (2020.01)

(58) Field of Classification Search
CPC ............ B60N 2/4279; B60R 21/0134; B60R 2021/01259; B60T 7/22; B60T 8/17; B60T 2201/024; G01S 13/931; G01S 2013/93185
See application file for complete search history.

(56) References Cited

U.S. PATENT DOCUMENTS

| | | | | |
|---|---|---|---|---|
| 2006/0090946 | A1* | 5/2006 | Zhao | B60R 22/02 180/268 |
| 2008/0238075 | A1* | 10/2008 | Bullinger | B60R 21/015 280/806 |
| 2009/0210114 | A1* | 8/2009 | Baumann | B60T 7/12 701/45 |
| 2013/0073149 | A1* | 3/2013 | Schoerrig | B60R 22/48 701/45 |
| 2016/0229415 | A1* | 8/2016 | Laakmann | G06K 9/00832 |
| 2017/0361796 | A1 | 12/2017 | Kim et al. | |
| 2018/0105131 | A1* | 4/2018 | Freienstein | B60R 21/0132 |
| 2018/0201216 | A1* | 7/2018 | Freienstein | B60R 21/01538 |

FOREIGN PATENT DOCUMENTS

| | | | | |
|---|---|---|---|---|
| DE | 102014223618 A1 | | 5/2016 | |
| DE | 102016123967 A1 | * | 12/2017 | .......... B60W 30/085 |
| EP | 1454806 A2 | | 9/2004 | |
| EP | 1122136 B1 | * | 11/2005 | ....... B60R 21/01558 |
| EP | 1625979 A1 | | 2/2006 | |
| EP | 1785317 A1 | | 5/2007 | |
| EP | 1456065 B1 | * | 7/2007 | .......... B60R 21/013 |
| GB | 2382802 A | * | 6/2003 | ............. B60R 22/28 |
| JP | 2005028992 A | | 2/2005 | |
| JP | 2010143358 A | | 7/2010 | |
| WO | 2009137582 | | 11/2009 | |
| WO | 2009156088 A1 | | 12/2009 | |

* cited by examiner

METHOD AND CONTROL UNIT FOR ACTIVATING AN EMERGENCY BRAKING FUNCTION OF A VEHICLE

FIELD OF THE INVENTION

The present invention is directed to a device and to a method for activating an emergency braking function of a vehicle. The present invention also relates to a computer program.

BACKGROUND INFORMATION

Patent document U.S. Pat. No. 7,654,573 discusses a method for tightening a seat belt upon identification of an impending collision. A two-stage tightening concept is implemented in the process, as a function of a pedal actuation.

SUMMARY OF THE INVENTION

Against this background, the approach described here introduces a method for activating an emergency braking function of a vehicle, a control unit which uses this method, and finally a corresponding computer program as recited in the main claims. The measures listed in the dependent claims allow advantageous refinements of and improvements on the device described in the independent claim.

A method for activating an emergency braking function of a vehicle is introduced, the method including the following steps:

activating at least one restraint unit for restraining at least one occupant of the vehicle in response to an identification of an imminent triggering of the emergency braking function, using at least one sensor signal of at least one sensor of the vehicle; and triggering the emergency braking function when the restraint unit was activated.

An emergency braking function may be understood to mean a function of a driver assistance system for automatically decelerating the vehicle in an emergency situation, such as in the case of an imminent collision. For this purpose, the emergency braking function may, for example, resort to signals of a surroundings sensor system for detecting surroundings of the vehicle or of a vehicle sensor system for detecting different vehicle parameters characterizing an instantaneous driving state of the vehicle, such as a speed, steering angle or yaw rate. A restraint unit may be understood to mean a reversible or irreversible safety unit. For example, the restraint unit may be a seat belt tensioner or a seat adjustment mechanism. The sensor signal may be a signal provided by the surroundings sensor system, by the vehicle sensor system, by a passenger compartment or seat occupancy sensor system of the vehicle or by at least two of the described sensor systems. For example, the emergency braking function may be triggered after expiration of a fixedly predefined time period, or a time period variable as a function of a predicted accident severity, after activation of the restraint unit, corresponding braking or steering actuators of the vehicle being activated.

The approach described here is based on the finding that a reversible safety unit, such as a seat belt tensioner or a seat adjustment mechanism, may be activated prior to a predicted automatic emergency brake application of a vehicle. In this way, it may be ensured that the vehicle occupants are fixed in a defined position before the vehicle is sharply decelerated. It is thus possible to avoid or at least mitigate injuries of the vehicle occupants. It is particularly advantageous when the activation of the safety unit preceding the automatic emergency brake application takes place as a function of a predicted accident severity, for example.

According to one specific embodiment, the restraint unit may be activated in the step of activating to tighten a seat belt of the occupant or, in addition or as an alternative, to adjust a seat of the occupant. In this way, the occupant may be securely fixed in a defined position prior to the emergency brake application. Injuries of the occupant during the emergency brake application may thus be effectively prevented.

According to another specific embodiment, a presumable accident severity, a position of the occupant or a mass of the occupant, or a combination of at least two of the described parameters may be ascertained in a step of ascertaining, using the sensor signal. Accordingly, in the step of activating, the restraint unit may be activated as a function of the accident severity, the position of the occupant or the mass of the occupant. An accident severity may be understood to mean, for example, a weighting value, based on which an identified driving situation may be weighted with respect to a hazard originating therefrom for the occupant or other road users. The sensor signal may, for example, represent a signal generated by a passenger compartment sensor for detecting a passenger compartment of the vehicle or, as an alternative or in addition, by a seat occupancy sensor for detecting a seat occupancy of the vehicle. The protective effect of the method may be considerably enhanced by this specific embodiment.

It is furthermore advantageous when, in the step of activating, the restraint unit is activated with delay or in an accelerated manner as a function of the presumable accident severity. For example, when a low accident severity is ascertained, the restraint unit may be activated with delay, or when a high accident severity is ascertained, the restraint unit may be activated in an accelerated manner, upon identification of the imminent triggering of the emergency braking function. In this way, it is possible to ensure that the occupant is always fixed in the best possible position, as a function of the accident severity, before the vehicle is automatically decelerated.

The method may furthermore include a step of identifying an imminent triggering of the emergency function, using the sensor signal. The sensor signal may represent a signal generated by a surroundings sensor for detecting surroundings of the vehicle or, in addition or as an alternative, by a vehicle sensor for detecting an instantaneous driving state of the vehicle. A surroundings sensor may, for example, be understood to mean a camera or a radar, LIDAR or ultrasonic sensor. A vehicle sensor may, for example, be understood to mean an acceleration or steering angle sensor. As a result of this specific embodiment, a reliable and fast identification of an emergency situation of the vehicle necessitating an automatic emergency brake application may be ensured.

This method may, for example, be implemented in software or hardware or in a mixed form made up of software and hardware, for example in a control unit.

The approach described here furthermore creates a control unit which is configured to carry out, activate or implement the steps of one variant of a method described here in corresponding units. The object of the present invention may also be achieved quickly and efficiently by this embodiment variant of the present invention in the form of a control unit.

For this purpose, the control unit may include at least one processing unit for processing signals or data, at least one memory unit for storing signals or data, at least one interface to a sensor or an actuator for reading in sensor signals from the sensor or for outputting control signals to the actuator and/or at least one communication interface for reading in or outputting data which are embedded into a communication protocol. The processing unit may be a signal processor, a microcontroller or the like, for example, it being possible for the memory unit to be a Flash memory, an EPROM or a magnetic memory unit. The communication interface may be configured to read in or output data wirelessly and/or in a wire-bound manner, a communication interface which is able to read in or output wire-bound data being able to read these data in, for example electrically or optically, from a corresponding data transmission line or output these into a corresponding data transmission line.

A control unit within the present context may be understood to mean an electrical device which processes sensor signals and outputs control and/or data signals as a function thereof. The control unit may include an interface which may be configured as hardware and/or software. In the case of a hardware configuration, the interfaces may, for example, be part of a so-called system ASIC which includes a wide variety of functions of the control unit. However, it is also possible for the interfaces to be separate integrated circuits, or to be at least partially made up of discrete elements. In the case of a software configuration, the interfaces may be software modules which are present on a microcontroller, for example, in addition to other software modules.

In one advantageous embodiment, the control unit carries out a control of the vehicle. For this purpose, the control unit may access sensor signals, for example, such as acceleration, pressure, steering angle or surroundings sensor signals. The activation takes place via actuators, such as brake or steering actuators, or an engine control unit of the vehicle.

In addition, a computer program product or computer program is advantageous, having program code which may be stored on a machine-readable carrier or memory medium such as a semiconductor memory, a hard disk memory or an optical memory, and which is used to carry out, implement and/or activate the steps of the method according to one of the specific embodiments described above, in particular if the program product or program is executed on a computer or a device.

Exemplary embodiments of the present invention are shown in the drawings and are described in greater detail in the following description.

In the following description of favorable exemplary embodiments of the present invention, identical or similar reference numerals are used for similarly acting elements shown in the different figures, and a repeated description of these elements is dispensed with.

DETAILED DESCRIPTION

Figure 1:
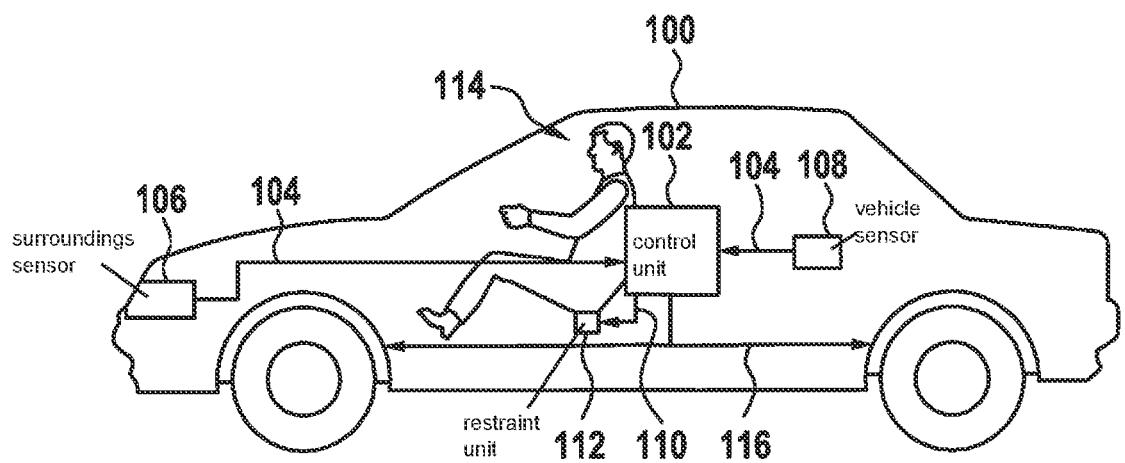
FIG. 1 shows a schematic representation of a vehicle including a control unit according to one exemplary embodiment.

FIG. 1 shows a schematic representation of a vehicle 100 including a control unit 102 according to one exemplary embodiment. Control unit 102 is configured to receive a sensor signal 104, which according to this exemplary embodiment represents a signal generated by a surroundings sensor 106 for detecting surroundings of vehicle 100 and by a vehicle sensor 108 for detecting an instantaneous driving state of vehicle 100, and to evaluate it with respect to the identification of a presumable emergency situation which triggers an automatic emergency brake application of vehicle 100. If control unit 102, within the scope of this evaluation, identifies such an emergency situation, which thus implies an imminent triggering of an emergency braking function of vehicle 100, control unit 102 generates an activation signal 110 for activating at least one restraint unit 112 for restraining an occupant 114. According to FIG. 1, restraint unit 112 is implemented as a seat belt tensioner by way of example. However, restraint unit 112 may, for example, also be another, in particular, reversible, restraint unit, such as a seat adjustment mechanism for adjusting a seat of occupant 114. As a result of the activation of restraint unit 112, occupant 114 is fixed in the seat, for example by tensioning the seat belt. Only after restraint unit 112 has been activated does control unit 102 generate a trigger signal 116 for triggering the emergency braking function, such as by a corresponding actuation of brake or steering actuators of vehicle 100. As a result of such a chronologically offset activation of restraint unit 112 and of the emergency braking function, it is possible to achieve that occupant 114 is exposed to what may be a low risk of injury by the vehicle deceleration caused by the emergency brake application.

Figure 2:
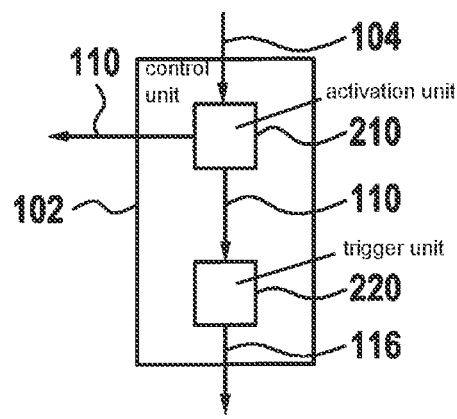
FIG. 2 shows a schematic representation of a control unit from FIG. 1.

FIG. 2 shows a schematic representation of a control unit 102 from FIG. 1. Control unit 102 includes an activation unit 210 for generating and outputting activation signal 110 for activating the restraint unit, using sensor signal 104, and a trigger unit 220, which is coupled to activation unit 210, for generating and outputting trigger signal 116 for triggering the emergency braking function, using activation signal 110.

Figure 3:
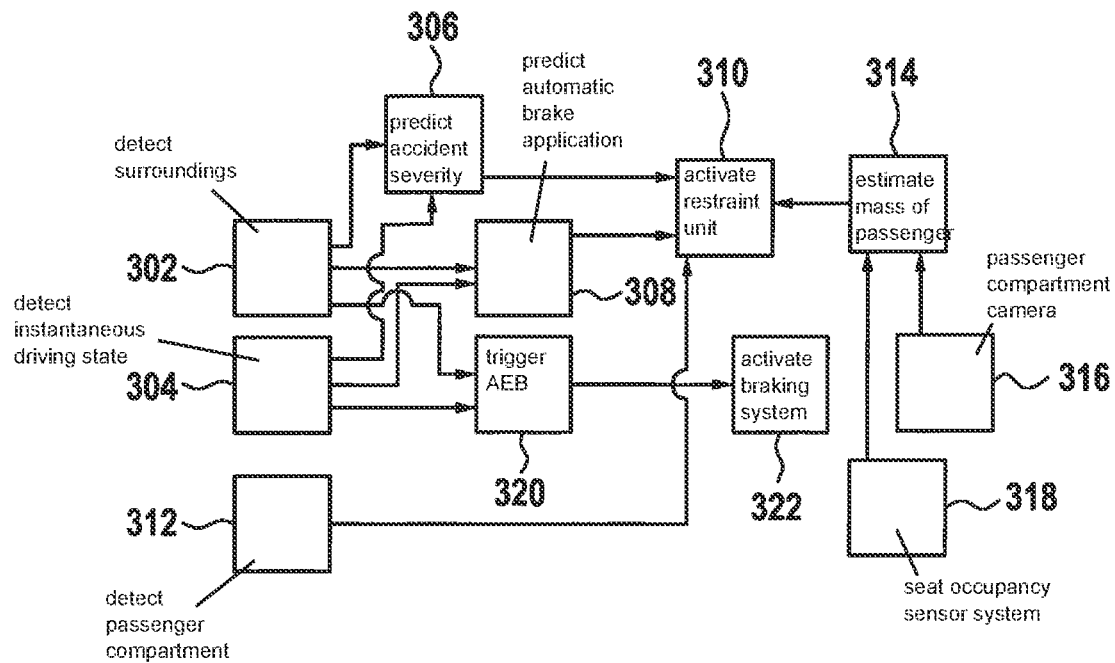
FIG. 3 shows a block diagram for illustrating a possible course of a method according to one exemplary embodiment.

FIG. 3 shows a block diagram for illustrating a possible course of a method according to one exemplary embodiment. The method may be carried out, for example, using a control unit, as described above based on FIGS. 1 and 2. In a block 302, the surroundings of the vehicle are detected, using a surroundings detection system of the vehicle. In a block 304, the instantaneous driving state is detected, using a corresponding inertial and vehicle sensor system of the vehicle. The data provided by blocks 302, 304 are incorporated into a block 306 in which the data are evaluated to predict an accident severity. In addition, the data of the two blocks 302, 304 are evaluated in a block 308 for predicting an automatic emergency brake application. In response to the prediction of the accident severity and the prediction of the automatic emergency brake application, the restraint unit, for example, of an individual, reversible restraint system of the vehicle, is activated in a block 310. According to one exemplary embodiment, the restraint unit is activated using data of a passenger compartment detection system of the vehicle, this data, for example, representing a distance between the occupant and a steering wheel or a dashboard of the vehicle. The detection of the passenger compartment by the passenger compartment detection system is indicated by a block 312. According to another exemplary embodiment, the restraint unit is additionally or alternatively activated based on a mass estimation of the occupant, indicated by a block 314, using data of a passenger compartment camera 316 or also of a seat occupancy sensor system 318 of the vehicle.

The activation of the restraint unit takes place prior to the triggering of the automatic emergency brake application, also referred to as AEB in short, using the sensor data provided by the two blocks 302, 304. The triggering is denoted by a block 320. During the triggering in block 320, a braking system 322 of the vehicle is activated in a suitable manner. The emergency brake application is predicted, so that, in one exemplary embodiment, in extreme cases the activation of the restraint unit and the activation of the emergency brake application may also alternatively take place in an (almost) simultaneous chronological step.

Figure 4:
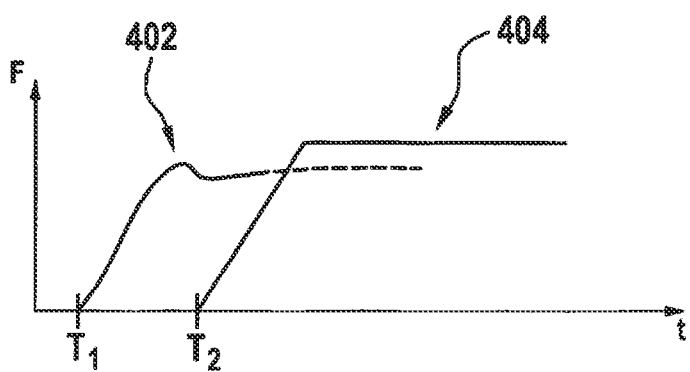
FIG. 4 shows a diagram for illustrating a force progression of a seat belt tensioning force and a vehicle deceleration during activation of an emergency braking function by a control unit according to one exemplary embodiment.

FIG. 4 shows a diagram for illustrating a force progression of a seat belt tensioning force and of a vehicle deceleration during activation of an emergency braking function by a control unit according to one exemplary embodiment, such as by the control unit described above based on FIGS. 1 through 3. Shown is a respective progression of a force application F caused by a seat belt tensioner or by the vehicle deceleration as a function of time t. The force progression of the seat belt tensioning force is indicated by a first curve 402. The force progression of the vehicle deceleration is indicated by a second curve 404. A first point in time T1 represents the prediction of the automatic emergency brake application, and a second point in time T2 represents the actual activation of the automatic emergency brake application. As is apparent from the force progression of the seat belt tensioning force, the seat belt tensioning force reaches its maximum just before the automatic emergency brake application is activated at second point in time T2.

Figure 5:
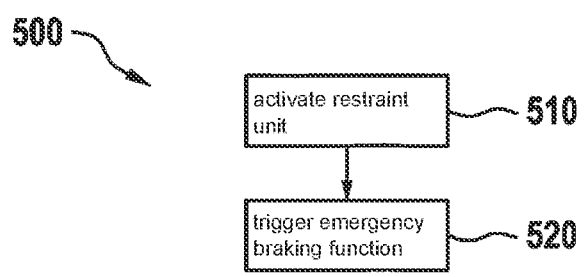
FIG. 5 shows a flow chart of a method according to one exemplary embodiment.

FIG. 5 shows a flow chart of a method 500 according to one exemplary embodiment. Method 500 for activating an emergency braking function of a vehicle may be carried out using the control unit described above based on FIGS. 1 through 4, for example.

In a step 510, the restraint unit is activated in response to the identification of the imminent triggering of the emergency brake application, in particular, for example, as a function of a presumable accident severity. In a further step 520, the emergency braking function is triggered in response to the activation of the restraint unit, or more precisely after the activation of the restraint unit has taken place, to decelerate the vehicle in time to avoid an accident.

In method 500, a triggering of an automated emergency brake application is predicted, and an individual reversible restraint system, such as an electrical seat belt tensioner or an electrical seat adjustment system, is activated before the emergency brake application is triggered, so that the emergency brake application only starts when the occupant has been sufficiently fixed or positioned. Furthermore, an exemplary embodiment is conceivable in which the emergency brake application is predicted, so that in extreme cases the activation of the restraint unit and the activation of the emergency brake application may take place in an (almost) simultaneous chronological step.

The vehicle surroundings are monitored in the process by at least one surroundings detection system, such as with the aid of radar, LIDAR or video. With the aid of the surroundings data, the control unit identifies an impending collision with an object in the surroundings. In addition, the control unit also evaluates the avoidability of the collision by appropriate steering or braking interventions, for example.

The prediction of the automated emergency brake application takes place, for example, based on a piece of information, detected by the surroundings detection system, about a relative movement of the vehicle relative to the collision object, about a vehicle's own trajectory or about the course of a road. The evaluation of data from the surroundings detection, such as the relative speed, distance or relative position of the vehicle, and of an instantaneous driving state, represented, for example, by the vehicle's own speed, steering angle, i.e., the vehicle's own trajectory, or yaw rate of the vehicle, is carried out using an appropriate algorithm. Further control units for individual, reversible restraint systems are informed in the process about an activation of the automated emergency brake application taking place in a defined time period.

The electrical seat belt tensioner is activated as a function of this piece of information, so that the seat belt of the occupant is sufficiently tightened.

In addition or as an alternative, the electrical seat adjustment system is activated based on this piece of information to optimize the backrest inclination, seat cushion inclination, and longitudinal and height adjustment of the seat.

According to a further exemplary embodiment, a reversible anti-submarining element is activated based on this piece of information.

As an alternative, a predicted accident severity, a deceleration path available to the occupant, such as the distance of the occupant from the steering wheel or from the dashboard, or also a mass of the occupant, is taken into consideration during the activation of the restraint unit.

If an accident with low severity is forecast, the activation of the restraint unit is delayed, for example. In contrast, if an accident with high severity is forecast, the restraint unit is activated accordingly sooner, for example, to achieve better coupling of the occupant during the subsequent accident.

The distance of the occupant from the steering wheel or from the dashboard, or also the mass of the occupant, is utilized, for example, to optimize the activation of the seat belt tensioner with respect to time and force. An occupant having a great mass, for example, requires a higher seat belt tensioning force. An occupant sitting too far back in the vehicle, i.e., situated behind a standard position, is accordingly fixed with the aid of a lower seat belt force or by a later activation of the seat belt tensioner.

The prediction of the accident severity takes place, for example, based on the relative speed and based on a prediction of the relative speed at the point in time of the collision, and additional pieces of information of the surroundings detection system, such as object width, height or type.

The position of the occupant is monitored with the aid of an appropriate passenger compartment detection system. If the occupant is situated in a critical position or behind the standard position, this is identified by an algorithm, and an appropriate piece of information is forwarded.

The mass of the occupant is identified, for example, with the aid of the passenger compartment detection system via the ascertainment of a volume of the occupant. As an alternative, the mass of the occupant is identified with the aid of a seat occupancy identification in the vehicle.

If one exemplary embodiment includes an "and/or" linkage between a first feature and a second feature, this should be read in such a way that the exemplary embodiment according to one specific embodiment includes both the first feature and the second feature, and according to an additional specific embodiment includes either only the first feature or only the second feature.

What is claimed is:

1. A method for activating an emergency braking function of a vehicle, the method comprising the following steps:
   activating at least one restraint unit for restraining at least one occupant of the vehicle in response to an identification of an imminent triggering of the emergency braking function, using at least one sensor signal of at least one sensor of the vehicle; and
   triggering the emergency braking function when the restraint unit was activated and/or while the restraint unit is being activated;
   wherein the method further comprises ascertaining, using the at least one sensor signal used for activating the at least one restraint unit, a predicted accident severity,
   wherein the restraint unit is activated in the activating step as a function of the ascertained predicted accident severity, and
   wherein, in the activating, the restraint unit is activated with delay and/or in an accelerated manner as a function of the ascertained predicted accident severity, wherein the higher the ascertained predicted accident severity, the sooner the restraint unit is activated.

2. The method of claim 1, wherein, in the activating, the restraint unit is activated to tighten a seat belt of the occupant and/or to adjust a seat of the occupant.

3. The method of claim 1, further comprising:
   identifying the imminent triggering of the emergency braking function, using the sensor signal, the sensor signal representing a signal generated by a surroundings sensor for detecting the surroundings of the vehicle and/or by a vehicle sensor for detecting an instantaneous driving state of the vehicle.

4. The method as recited in claim 1, wherein, in the activating step, the at least one restraint device is activated in such a way that vehicle occupants are fixed in a defined position before the emergency braking function is triggered.

5. The method as recited in claim 1, wherein, in the activating step, the at least one restraint device is activated in accordance with a distance between (i) the at least one occupant and (ii) a steering wheel or dashboard.

6. The method as recited in claim 1, wherein in the ascertaining step, a position of the occupant is ascertained using the at least one sensor signal used for activating the at least one restraint unit, and the restraint unit is activated in the activating step as a function of the ascertained position of the occupant.

7. The method as recited in claim 1, wherein in the ascertaining step, a mass of the occupant is ascertained using the at least one sensor signal used for activating the at least one restraint unit, and the restraint unit is activated in the activating step as a function of the ascertained mass of the occupant.

8. A control apparatus for activating an emergency braking function of a vehicle, comprising:
   a control unit configured to perform the following:
      activating at least one restraint unit for restraining at least one occupant of the vehicle in response to an identification of an imminent triggering of the emergency braking function, using at least one sensor signal of at least one sensor of the vehicle; and
      triggering the emergency braking function when the restraint unit was activated and/or while the restraint unit is being activated;
      wherein the control unit is further configured to perform ascertaining, using the at least one sensor signal used for activating the at least one restraint unit, a predicted accident severity,
   wherein the restraint unit is activated in the activating step as a function of the ascertained predicted accident severity, and
   wherein, in the activating step, the restraint unit is activated by the control unit with delay and/or in an accelerated manner as a function of the ascertained predicted accident severity, wherein the higher the ascertained predicted accident severity, the sooner the restraint unit is activated.

9. A non-transitory computer readable medium having a computer program, which is executable by a processor, comprising:
   a program code arrangement having program code for activating an emergency braking function of a vehicle, the program code, when executed by the processor, causing the processor to perform the following steps:
      activating at least one restraint unit for restraining at least one occupant of the vehicle in response to an identification of an imminent triggering of the emergency braking function, using at least one sensor signal of at least one sensor of the vehicle; and
      triggering the emergency braking function when the restraint unit was activated and/or while the restraint unit is being activated;
      wherein the program code, when executed by the processor, causes the processor to perform the following step: ascertaining, using the at least one sensor signal used for activating the at least one restraint unit, a predicted accident severity,
   wherein the restraint unit is activated in the activating step as a function of the ascertained predicted accident severity, and
   wherein, in the activating, the restraint unit is activated with delay and/or in an accelerated manner as a function of the ascertained predicted accident severity, wherein the higher the ascertained predicted accident severity, the sooner the restraint unit is activated.

10. The computer readable medium of claim 9, wherein, in the activating, the restraint unit is activated to tighten a seat belt of the occupant and/or to adjust a seat of the occupant.

* * * * *